United States Patent
Okada et al.

(10) Patent No.: US 6,903,876 B2
(45) Date of Patent: Jun. 7, 2005

(54) DISPLAY

(75) Inventors: Toru Okada, Kawasaki (JP); Masanao Fujii, Kawasaki (JP); Seiichi Shimoura, Kawasaki (JP); Shingo Yamaguchi, Kawasaki (JP); Haruyasu Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 10/309,575

(22) Filed: Dec. 4, 2002

(65) Prior Publication Data

US 2003/0103169 A1 Jun. 5, 2003

(30) Foreign Application Priority Data

Dec. 5, 2001 (JP) ........................................ 2001-371922

(51) Int. Cl.⁷ .............................................. G02B 27/14
(52) U.S. Cl. .......................... 359/633; 359/631; 359/630
(58) Field of Search ................................ 359/630, 631, 359/633; 345/7–9

(56) References Cited

U.S. PATENT DOCUMENTS

| | | | | |
|---|---|---|---|---|
| 4,711,512 A | * | 12/1987 | Upatnieks ....................... 345/7 |
| 5,369,415 A | * | 11/1994 | Richard et al. ................. 345/6 |
| 5,453,877 A | * | 9/1995 | Gerbe et al. ................... 359/633 |
| 5,537,253 A | | 7/1996 | Cox et al. ..................... 359/630 |
| 5,768,025 A | | 6/1998 | Togino et al. ................. 359/633 |
| 5,790,312 A | | 8/1998 | Togino ......................... 359/631 |
| 5,880,888 A | * | 3/1999 | Schoenmakers et al. ..... 359/631 |
| 5,995,291 A | | 11/1999 | Togino ......................... 359/631 |
| 6,128,136 A | | 10/2000 | Togino et al. ................. 359/630 |
| 6,181,475 B1 | | 1/2001 | Togino et al. ................. 359/630 |
| 6,791,760 B2 | * | 9/2004 | Janeczko et al. ........... 359/630 |
| 2001/0010598 A1 | | 8/2001 | Aritake et al. ............... 359/630 |
| 2002/0171939 A1 | * | 11/2002 | Song ........................... 359/630 |
| 2003/0086135 A1 | * | 5/2003 | Takeyama ..................... 359/13 |

FOREIGN PATENT DOCUMENTS

| | | |
|---|---|---|
| JP | 5-134208 | 5/1993 |
| JP | 8-506429 | 7/1996 |
| JP | 9-258104 | 10/1997 |
| JP | 2001-290102 | 10/2001 |

* cited by examiner

*Primary Examiner*—Ricky Mack
(74) *Attorney, Agent, or Firm*—Greer, Burns & Crain, Ltd.

(57) ABSTRACT

A body has a configuration in which a first ellipse has a first and second focal points and a second ellipse having a third and fourth points are arranged such that the second and third focal points coincide. This body is equivalent to an optical system having an optical path in which light gathered to the first focal point passes through the first focal point, and is reflected by a first concave reflecting surface, being a part of the first ellipse, to go through the second focal point, and then reflected by a second concave reflecting surface, being a part of the second ellipse, to be gathered to the fourth focal point.

13 Claims, 13 Drawing Sheets

FIG.8

| | IMAGING LENS | | | | | CORRECTING LENS | | | |
|---|---|---|---|---|---|---|---|---|---|
| TYPES | f | φ | MATERIALS | tc | r | TYPES | r1 | r2 | tc |
| PLANO-CONVEX | 20.00 | 12.00 | BK7 | 3.90 | 10.37 | BICONCAVE | 172.27 | 503.23 | 5.00 |
| PLANO-CONVEX | 21.00 | 15.00 | BK7 | 5.00 | 10.89 | BICONCAVE | 240.44 | 611.33 | 5.00 |
| PLANO-CONVEX | 22.00 | 9.00 | BK7 | 2.90 | 11.41 | — | — | — | — |
| PLANO-CONVEX | 20.00 | 10.00 | BK7 | 3.30 | 10.37 | BICONCAVE | 199.19 | 504.51 | 5.00 |
| PLANO-CONVEX | 25.00 | 15.00 | BK7 | 4.40 | 12.97 | — | — | — | — |
| PLANO-CONVEX | 21.00 | 6.00 | BK7 | 1.42 | 10.85 | BICONCAVE | 521.54 | 718.94 | 5.00 |
| PLANO-CONVEX | 24.00 | 6.00 | BK7 | 1.50 | 12.40 | — | — | — | — |
| PLANO-CONVEX | 22.00 | 9.00 | SF5 | 1.93 | 11.37 | — | — | — | — |
| PLANO-CONVEX | 18.00 | 12.00 | BK7 | 3.00 | 12.12 | BICONCAVE | 88.67 | 216.85 | 5.00 |
| PLANO-CONVEX | 18.00 | 8.00 | BK7 | 2.90 | 9.34 | BICONCAVE | 87.85 | 229.65 | 5.00 |
| PLANO-CONVEX | 17.00 | 6.00 | BK7 | 2.50 | 8.82 | BICONCAVE | 131.16 | 90.89 | 5.00 |
| PLANO-CONVEX | 15.00 | 8.00 | BK7 | 3.10 | 7.78 | — | — | — | — |

| SURF | X | Z | θ |
|---|---|---|---|
| OBJ | 0.37461 | 0.92718 | 0.0000 |
| 1 | 0.00000 | 0.00000 | 0.0000 |
| S2 | 0.00000 | 0.00000 | 0.0000 |
| S3 | 0.00000 | -4.00000 | 0.0000 |
| 4 | 0.00000 | -4.00000 | -22.0000 |
| 5 | -15.65993 | -1.98712 | -71.3237 |
| S6 | -15.65993 | -1.98712 | -71.3237 |
| S7 | -21.34399 | -3.90844 | -71.3237 |
| 8 | -16.45304 | -18.37785 | -22.0000 |
| 9 | -29.56427 | -50.82928 | -22.0000 |
| S10 | -29.56427 | -50.82928 | -22.0000 |
| S11 | -30.50078 | -53.14724 | -22.0000 |

| S6 | | |
|---|---|---|
| x | y | z |
| 13.5574 | 5.571812e-20 | 0.710246 |
| 13.5576 | 0.154515 | 0.71035 |
| 13.5576 | -0.154515 | 0.71035 |
| 13.7029 | 5.614069e-20 | 0.725615 |
| 13.4145 | 5.530021e-20 | 0.695311 |
| 16.6874 | -2.19314 | 1.09627 |
| 16.6733 | -1.98805 | 1.0911 |
| 16.7013 | -2.39789 | 1.10172 |
| 16.9103 | -2.19392 | 1.12539 |
| 16.4673 | -2.19217 | 1.0679 |
| 16.6874 | 2.19314 | 1.09627 |
| 16.7013 | 2.39789 | 1.10172 |
| 16.6733 | 1.98805 | 1.0911 |
| 16.9103 | 2.19392 | 1.12539 |
| 16.4673 | 2.19217 | 1.0679 |
| 9.69379 | 2.66822 | 0.390139 |
| 9.69297 | 2.78583 | 0.392557 |
| 9.69491 | 2.55041 | 0.387847 |
| 9.8095 | 2.66171 | 0.398729 |
| 9.58029 | 2.67458 | 0.381815 |
| 9.69379 | -2.66822 | 0.390139 |
| 9.69491 | -2.55041 | 0.387847 |
| 9.69297 | -2.78583 | 0.392557 |
| 9.8095 | -2.66171 | 0.398729 |
| 9.58029 | -2.67458 | 0.381815 |

| S7 | | |
|---|---|---|
| x | y | z |
| 17.2567 | 7.585563e-20 | -1.70406 |
| 17.257 | 0.210361 | -1.70437 |
| 17.257 | -0.210361 | -1.70437 |
| 17.4779 | 7.654897e-20 | -1.74847 |
| 17.0404 | 7.517400e-20 | -1.66119 |
| 20.4074 | -1.73127 | -2.40999 |
| 20.3788 | -1.46114 | -2.39818 |
| 20.4359 | -2.0012 | -2.42265 |
| 20.749 | -1.72903 | -2.4919 |
| 20.0724 | -1.73315 | -2.33106 |
| 20.4074 | 1.73127 | -2.40999 |
| 20.4359 | 2.0012 | -2.42265 |
| 20.3788 | 1.46114 | -2.39818 |
| 20.749 | 1.72903 | -2.4919 |
| 20.0724 | 1.73315 | -2.33106 |
| 13.3961 | 2.24204 | -1.05173 |
| 13.4016 | 2.41053 | -1.05708 |
| 13.3911 | 2.07342 | -1.04678 |
| 13.57 | 2.23273 | -1.07839 |
| 13.2259 | 2.25111 | -1.02598 |
| 13.3961 | -2.24204 | -1.05173 |
| 13.3911 | -2.07342 | -1.04678 |
| 13.4016 | -2.41053 | -1.05708 |
| 13.57 | -2.23273 | -1.07839 |
| 13.2259 | -2.25111 | -1.02598 |

FIG.12
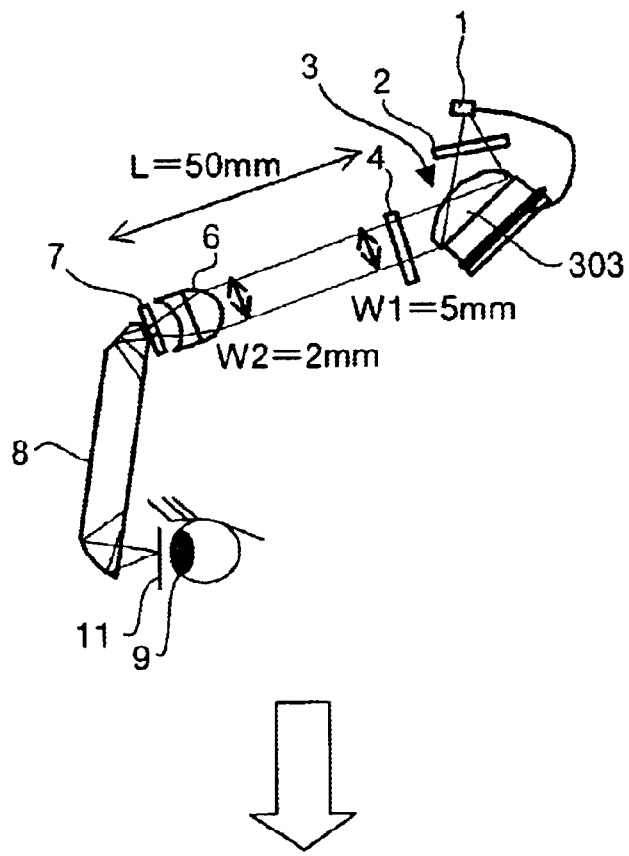
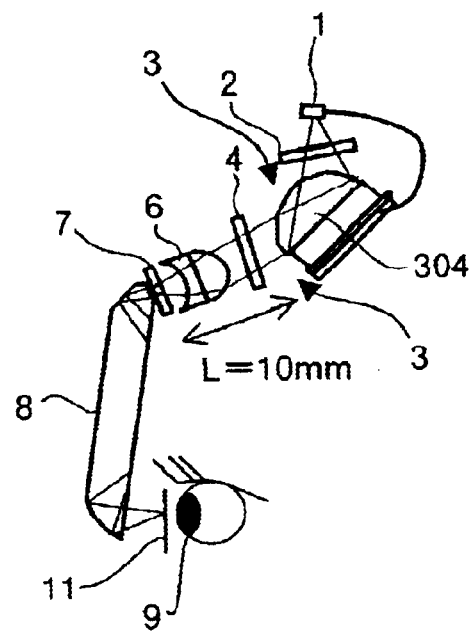

FIG.13
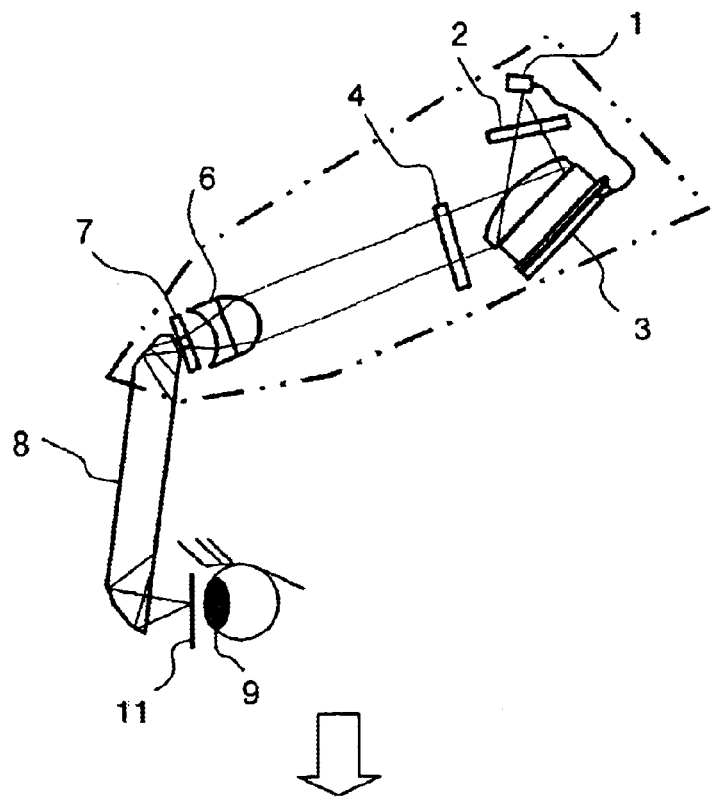
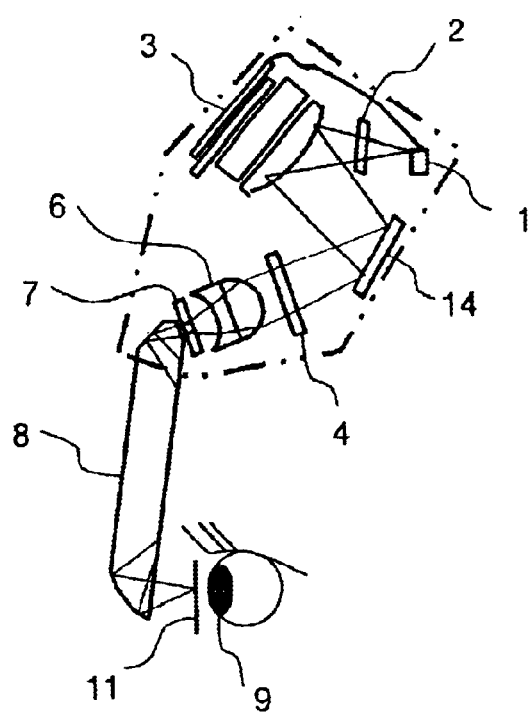

DISPLAY

FIELD OF THE INVENTION

The present invention relates to a display referred to as a head mount display or a spectacle-type display.

BACKGROUND OF THE INVENTION

Various kinds of displays which are mounted on the head to display images from a computer or a video device, that is, head mount displays are known. For example, in Japanese Patent Application Laid-Open No. 5-134208, it is proposed to use an elliptical body having two focal points in order to make a display small. That is, a part of the ellipse is used to form a concave mirror, so that light having passed through the display device and an eccentric lens group goes through a first focal point of the ellipse, and light reflected on the concave mirror goes through a second focal point, and the observer's eye is placed at the second focal point (see FIG. 1 in the above publication). In this manner, the light having passed through the first focal point is reflected on the concave mirror, and reliably passes through the second focal point to enter the observer's eye.

In the display disclosed in the above publication, however, when the observer mounts the display, the display device and the eccentric lens group are located at the side of the observer's eye, and there is the possibility that these may interfere with the observer's temporal region (a region near the ear). Therefore, it is necessary to construct the display such that the display device and the eccentric lens group do not interfere with the observer's temporal region.

In the configuration which uses two focal points of the ellipse, the display screen is likely to be distorted. That is, the angle of light emanated from the first focal point does not become the same as the angle of light gathered by the second focal point. Therefore, it is necessary to arrange a plurality of complicated eccentric lenses as the eccentric lens group in the vicinity of the display device, in order to match the angle of light entering the eye with the angle of light having passed through the display device. Hence, it is quite difficult to decrease the size of the display so as to be able to mount it on the head.

SUMMARY OF THE INVENTION

It is an object of this invention to provide a display used for observing an image in front of an observer's eye, which can be made small so as to be mounted on the head, without interfering with the observer's temporal region.

According to one aspect of the present invention, in order to achieve the above object, in a display configuring a head mount display, there are used the theory of the pinhole camera, and a divided light-guiding body having a configuration such that a virtual elliptic light-guiding body described below (hereinafter referred to as a "virtual elliptic light-guiding body") is divided into sections, and a plane of incidence and a flat total reflecting surface are formed at the end of the light-guiding body formed by this segmentation. That is, the virtual elliptic light-guiding body has a configuration in which a first ellipse having a first focal point and a second focal point and a second ellipse having a third focal point and a fourth focal point are arranged such that the first focal point and the fourth focal point are on the same line, the second focal point and the third focal point are overlapped each other, and the first focal point and the fourth focal point are disposed on the opposite sides with respect to the second focal point. The virtual elliptic light-guiding body is equal to an optical system having an optical path in which light gathered to the first focal point passes through the first focal point, and the light having passed through the first focal point is reflected by a first concave reflecting surface, being a part of the first ellipse, to advance towards the second focal point, and the light having passed through the second focal point is reflected by a second concave reflecting surface, being a part of the second ellipse, to be gathered to the fourth focal point. Actually, the first concave reflecting surface and the second concave reflecting surface are arranged on the same side with respect to a virtual line connecting the first focal point to the fourth focal point, and a pair of flat reflecting surfaces facing each other is formed between the first concave reflecting surface and the second concave reflecting surface. It is constructed such that the light reflected by the first concave reflecting surface passes through a focal point corresponding to the second focal point, located between the pair of reflecting surfaces, towards the second concave reflecting surface, while being reflected by the pair of flat reflecting surfaces. The virtual elliptic light-guiding body having such a configuration is divided into sections at a focal point corresponding to the second focal point, and is used as the light-guiding body.

According to the above aspect, an image is condensed on an observer's eye, and even a close virtual image can be seen well, as if it is a pinhole camera. Further, the configuration is such that the optical path of a virtual elliptic light-guiding body having highly symmetric property of the optical system is used by using a light-guiding body having a configuration such that a first and second ellipses are assumed in which the second focal point and the third focal point are arranged at a common position, and a first and second concave reflecting surfaces are also assumed by using the first and second ellipses, and the virtual elliptic light-guiding body is divided into sections. Hence, it is not necessary to use a plurality of complicated eccentric lenses as before, and as a result, the optical system can be made small and lightweight.

Other objects and features of this invention will become apparent from the following description with reference to the accompanying drawings.

BRIEF DESCRIPTION OF THE DRAWINGS

FIG. 8 is a chart which shows the summary of a result of the investigation made by the present inventors related to combinations of imaging lenses and correcting lenses in the display according to the present invention, FIG. 12 is a diagram which explains still another example of the optical system of the display according to the present invention, FIG. 13 is a diagram which explains an example in which a reflector is added in the optical system of the display according to the present invention.

DETAILED DESCRIPTIONS

Figure 2:
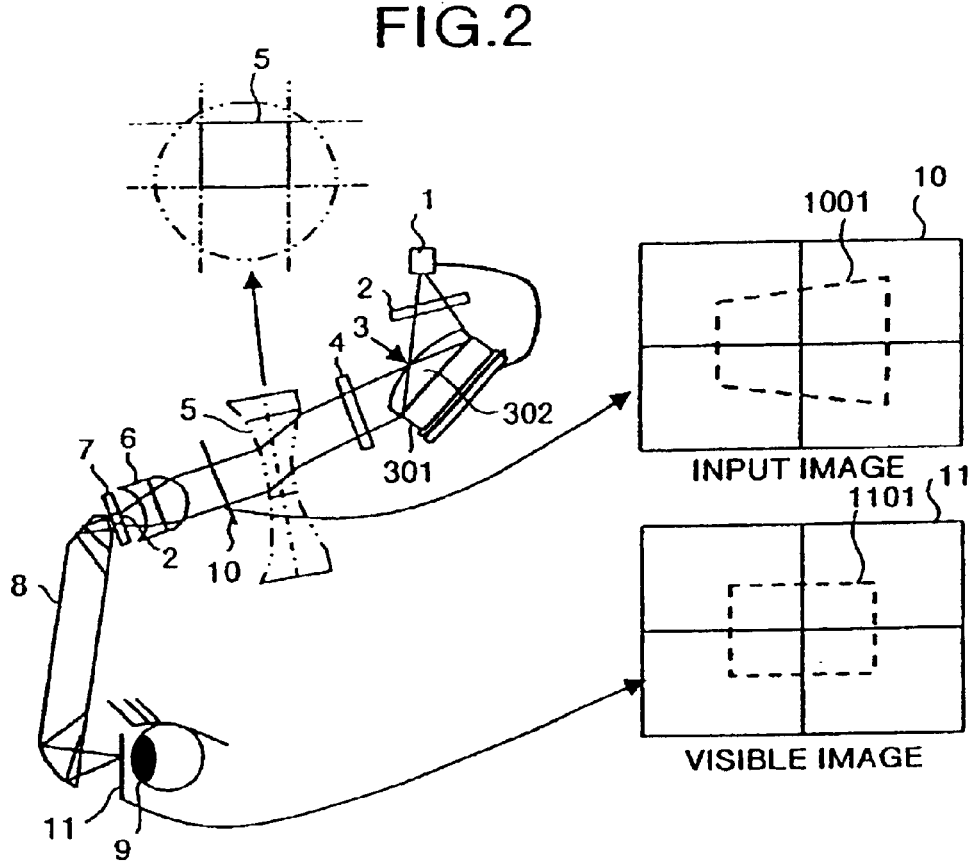
FIG. 2 is a diagram which explains one example of an optical system of a display according to the present invention.

The embodiments of the present invention will be explained below, with reference to the drawings. FIG. 2 is a diagram which shows one example of an optical system of a display according to the present invention. As shown in FIG. 2, this optical system comprises, a light emission element 1 consisting of for example a light emitting diode (LED), a polarizer 2 consisting of a polarizing plate, a display device 3 comprising a liquid crystal display device unit 301 and a field lens 302 integrated therewith, an analyzer 4 consisting of a polarizing plate, a correcting lens 5, an imaging device 6 consisting of an imaging lens, a pinhole element 7 with a pinhole 701 being open, and a divided light-guiding body 8.

In this optical system, light emitted from the light emission element 1 goes through the polarizer 2 to shine into the field lens 302, and is reflected on the reflection type liquid crystal display device of the liquid crystal display device unit 301. The reflected light sequentially goes through the field lens 302, the analyzer 4, the correcting lens 5 and the imaging device 6, and passes through the pinhole 701 to enter into one end of the divided light-guiding body 8 (entrance end). The incident light goes through the divided light-guiding body 8 while being reflected, and goes out from the other end (outgoing end) to enter an observer's eye 9, being an imaging section. In FIG. 2, a part of the optical path in the divided light-guiding body 8 is omitted.

In FIG. 2, reference numeral 10 denotes a virtual screen for explaining an image by means of the light emitted from the correcting lens 5, that is, light entering the imaging device 6. Similarly, reference numeral 11 denotes a virtual screen for explaining an image by means of the light emitted from the divided light-guiding body 8, that is, light entering an observer's eye 9. These virtual screens 10 and 11 are not actually arranged in the optical path. Reference numeral 1001 denotes an image on the virtual screen 10, that is, an image entering the imaging device 6. Reference numeral 1101 denotes an image on the virtual screen 11, that is, an image entering the eye 9. However, these images on the virtual screens 10 and 11 are images with respect to a rectangular screen of the liquid crystal display device unit 301.

In the liquid crystal display device unit 301, the reflection type liquid crystal display device is one of a small size employing for example a time sharing system, and displays an output screen from an external attachment such as a computer (not shown), for example, by 800×600 pixels (SVGA), though the number of pixels is not particularly limited. Since this liquid crystal display device employs the time sharing system, it can display one color by the number of pixels, one third the number of a liquid crystal display device of a type of observing a normal direct image. That is, since it has a smaller size (for example, 10×7.5 mm) and a larger number of pixels to be displayed compared to the normal liquid crystal display device, it is suitable for decreasing the size of the optical system having a head mount structure. The liquid crystal display device unit 301 is obtained by integrating the reflection type liquid crystal display device and a driving circuit of the light emission element 1, which will be explained later.

The divided light-guiding body 8 will now be explained. The divided light-guiding body 8 is obtained by dividing a virtual elliptical light-guiding body 801 shown in FIG. 3 at a predetermined position. This virtual elliptical light-guiding body 801 is described in detail in the former application (Japanese Patent Application No. 2000-22914) by the present inventors. However, it is necessary to explain the configuration of the virtual elliptical light-guiding body 801 for explaining the configuration of the divided light-guiding body 8. Therefore, the configuration of the virtual elliptical light-guiding body 801 will be explained first.

The virtual elliptical light-guiding body 801 comprises a first concave reflecting surface 811, being a part of a first ellipse 810 shown by a two-dot chain line, a second concave reflecting surface 821, being a part of a second ellipse 820 shown by a two-dot chain line and a light-guiding section 830 therebetween. Two focal points of the first ellipse 810, that is, a first focal point 812 and a second focal point 813, and two focal points of the second ellipse 820, that is, a third focal point 822 and a fourth focal point 823 are on the same line (A—A). The second focal point 813 overlaps on the third focal point 822. That is, the second focal point 813 and the third focal point 822 are located at a common position. Further, the first focal point 812 is located at an opposite position of the fourth focal point 823, putting the second focal point 813 (the third focal point 822) therebetween. The first concave reflecting surface 811 is located on the same side as the second concave reflecting surface 821, with respect to a virtual line connecting the four focal points 812, 813, 822 and 823 (that is, the above-described line A—A).

Figure 3:
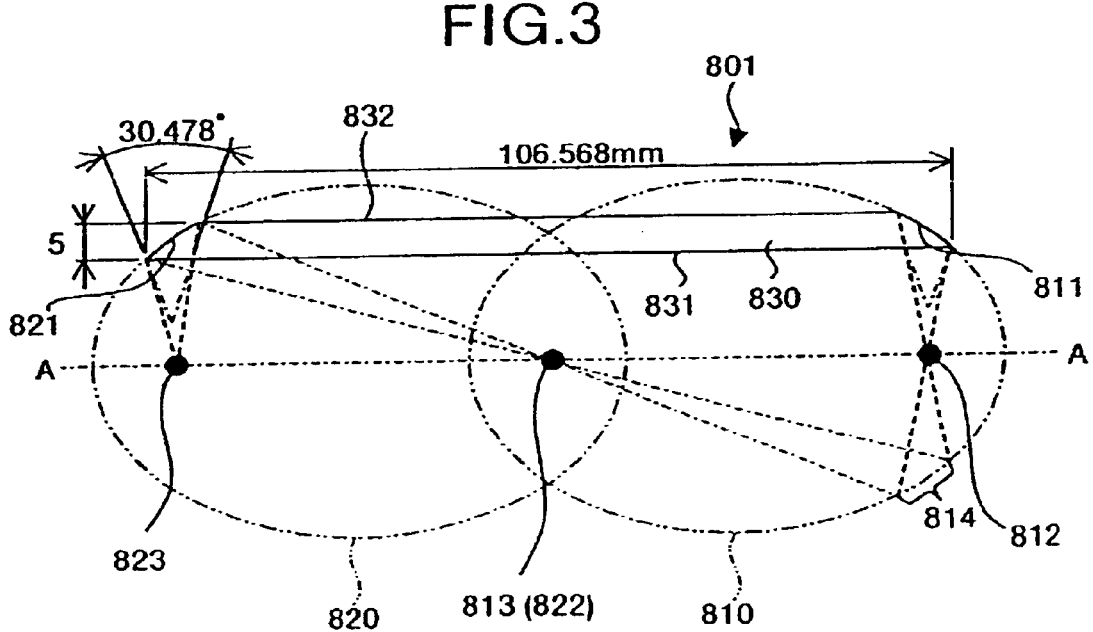
FIG. 3 is a diagram which explains a virtual elliptical light-guiding body, which is a source of a divided light-guiding body configuring the optical system of the display according to the present invention.

The optical path of this virtual elliptical light-guiding body 801 is equal to a virtual optical path shown by a one-dot chain line (however, excluding the line A—A) in FIG. 3. According to this virtual optical path, as shown in FIG. 3, light gathered to the first focal point 812 goes through the first focal point 812, and is reflected on a virtual concave reflecting surface 814, which is located at a position symmetrical to the first concave reflecting surface 811 with respect to the first focal point 812, and advances towards the second focal point 813. The light having passed through the second focal point 813 is reflected on the second concave reflecting surface 821, and gathered to the fourth focal point 823.

In the optical path of the virtual elliptical light-guiding body 801, light gathered to the first focal point 812 goes through the first focal point 812 in the direction opposite to the above case, that is, towards the first concave reflecting surface 811, and is reflected by the first concave reflecting surface 811. The reflected light advances towards the focal point in the light-guiding body, corresponding to the second focal point 813, while being reflected on a pair of flat reflecting surfaces 831 and 832 facing each other, between the first concave reflecting surface 811 and the second concave reflecting surface 821. The light having passed through the focal point corresponding to the second focal point 813 is reflected on the second concave reflecting surface 821 and gathered to the fourth focal point 823. Illustration of a part of the optical path of the light going through the light-guiding body 830 is omitted.

If it is attempted to realize a display of for example an angle of visibility of 30° (sensible screen 26 inch/1 m) by combining the virtual elliptical light-guiding body 801 having such a configuration and optical path, and a small liquid crystal display device of, for example, 10×7.5 mm square, and by designating the thickness of the virtual elliptical light-guiding body 801, as shown in FIG. 3, the length of the virtual elliptical light-guiding body 801 becomes 106.568 mm. Even with this length, it is possible to obtain a display (head mount display) as small as being mountable on the observer's head. However, in this embodiment, in order to obtain a smaller and more lightweight display, and to increase the degree of freedom in product design by alleviating a restriction on the incident angle of light, as shown in FIG. 4, a light-guiding body having a configuration in which the virtual elliptical light-guiding body 801 is divided by three dividing planes, that is, the above-described divided light-guiding body 8 is used.

Figure 4:
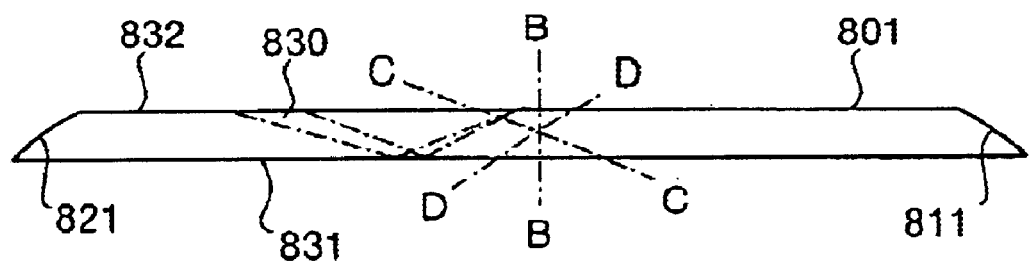
FIG. 4 is a diagram which explains the dividing plane of the virtual elliptical light-guiding body shown in FIG. 3.

In FIG. 4, a first dividing plane shown by a one-dot chain line B—B is a plane going through a middle point connecting the focal points within the virtual elliptical light-guiding body 801, that is, a focal point corresponding to the above-described second focal point 813 (third focal point 822). A second dividing plane shown by a one-dot chain line C—C is a plane which totally reflects light in the vicinity of the first dividing plane (B—B), when the light advances in the opposite direction of the optical path from the second focal point 813 (third focal point 822) towards the second concave reflecting surface 821 (shown by a one-dot chain line in FIG. 4, in the left half of the virtual elliptical light-guiding body 801), within the virtual elliptical light-guiding body 801.

A third dividing plane shown by a one-dot chain line D—D is a plane vertical to an optical axis of the light totally reflected by the second dividing plane (C—C). Actually, the light having passed through the pinhole 701 enters from the third dividing plane (D—D), and is totally reflected by the second dividing plane (C—C) and advances towards the second concave reflecting surface 821. Therefore, the third dividing plane (D—D) becomes a plane of incidence 841, and the second dividing plane (C—C) becomes the total reflecting surface 842. A reflection coating is applied by vacuum evaporation on this total reflecting surface 842 and the second concave reflecting surface 821, as required.

Figure 5:
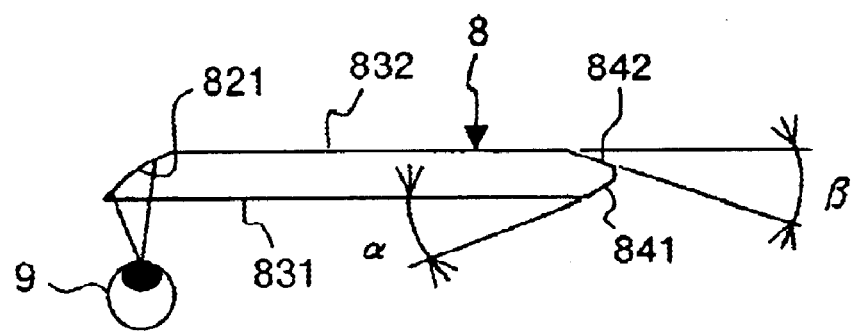
FIG. 5 is a diagram which explains the relation between an angle of a plane of incidence and an angle of a total reflecting surface, of the divided light-guiding body in the display according to the present invention.
Figure 6:
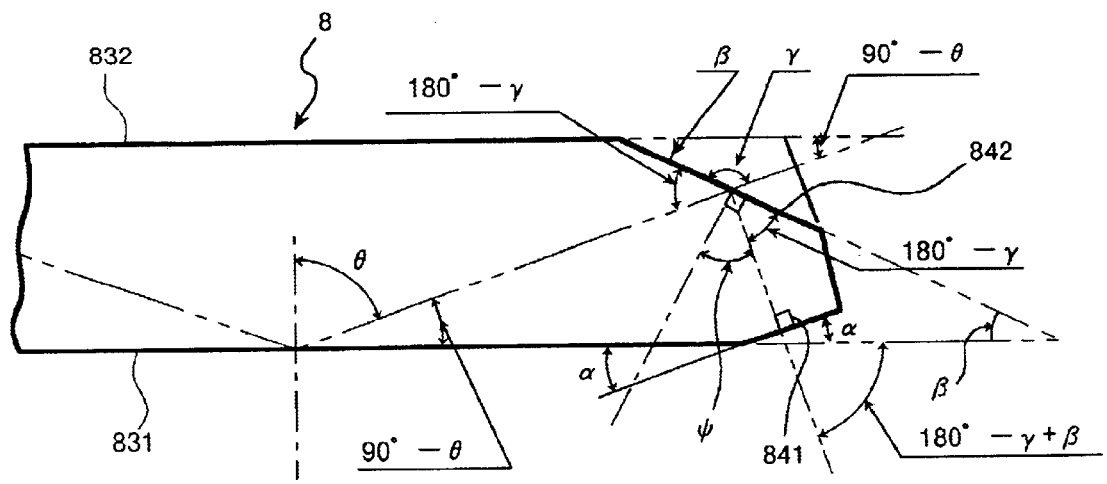
FIG. 6 is a diagram which explains the relation between the angle of a plane of incidence and the angle of a total reflecting surface, of the divided light-guiding body in the display according to the present invention.

The relation between the angle of the plane of incidence 841 and the angle of the total reflecting surface 842 in the divided light-guiding body 8 will now be explained. FIG. 5 is a diagram which shows the divided light-guiding body 8 for explaining the relation between the angle of the plane of incidence and the angle of the total reflecting surface, and FIG. 6 is a diagram which shows the main part thereof in an enlarged scale. One of the pair of flat reflecting surfaces 831 and 832, which is continuous to the plane of incidence 841 is designated as a first reflecting surface 831, and the other which is continuous to the total reflecting surface 842 is designated as a second reflecting surface 832. As shown in FIG. 5 or FIG. 6, the angle between the first reflecting surface 831 and the plane of incidence 841 is designated as $\alpha$, and the angle between the second reflecting surface 832 and the total reflecting surface 842 is designated as $\beta$. $\alpha$ is an angle put between the plane of incidence 841 and a virtual plane obtained by extending the first reflecting surface 831 towards the plane of incidence 841. Similarly, $\beta$ is an angle put between the total reflecting surface 842 and a virtual plane obtained by extending the second reflecting surface 832 towards the total reflecting surface 842.

As shown in FIG. 6, when an optical axis shown by a two-dot chain line is totally reflected on the total reflecting surface 842, and further reflected on the first reflecting surface 831, an angle between this optical axis and a normal of the first reflecting surface 831 is designated as $\theta$. Here, the critical angle for the total reflection of a glass with respect to the air is 42°, and hence the angle $\theta$ should be 42°<$\theta$<90°, in order that the total reflection is effected on the reflecting surface 831. An image displayed by the liquid crystal display device enters an observer's eye 9 with an adequate angle of view, thereby the observer can see the image. According to the verification conducted by the present inventors, with the combination of the liquid crystal display device having the above configuration and the divided light-guiding body 8, the optimum angle of $\theta$ is 70.5°.

In FIG. 6, 180°=$\gamma$+$\beta$+(90°−$\theta$), thereby $\gamma$=90°−$\beta$+$\theta$ is determined. On the other hand, from FIG. 6, 180°=(90°+$\alpha$)+$\beta$+(180°−$\gamma$), and hence from this expression and the previous expression of $\gamma$, the following expression (1) is established.

$$\theta = \alpha + 2\beta \quad (1)$$

When the value of a is a negative value, that is, a minus value, the plane of incidence 841 protrudes to the side than the virtual plane obtained by extending the first reflecting surface 831. Such a shape is not suitable, since a loss increases when the divided light-guiding body 8 is machined into a desired shape. Further, when the mounting structure at the time of mounting this optical system on the observer's head is taken into consideration, if a is 0°, the portion which houses the optical system becomes obstructive at the temple of the head. Therefore, $\alpha$>0°. Further, $\beta$ is also larger than 0°.

If an angle between the optical axis of the light entering the total reflecting surface 842 and the normal of the total reflecting surface 842 is designated as $\phi$, since the critical angle for the total reflection of a glass with respect to the air is 42°, as described above, the angle $\phi$ should be 42°<$\phi$<90°, in order that the total reflection is effected on the reflecting surface 842. From FIG. 6, since 90°=$\phi$+(180°−$\gamma$), and from the previous expression $\gamma$=90°−$\beta$+$\theta$, $\beta$=$\theta$−$\phi$.

From $\alpha$>0°, $\beta$>0° and the previous expression (1) the following expressions (2) and (3) are obtained. $\alpha$ is an optional angle which satisfies the expression (2), and $\beta$ is an optional angle which satisfies the expression (3).

$$0° < \alpha < \theta (=70.5°) \quad (2)$$

$$0° < \beta < (\theta - \alpha)/2 \quad (3)$$

According to the study by the present inventors, $\alpha$ is preferably from 15 to 25°, and about 20° is most preferable.

Figure 7:
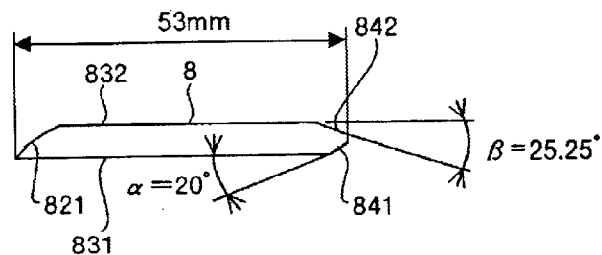
FIG. 7 is a diagram which shows an example in which the angle of the plane of incidence is 20° and the angle of the total reflecting surface is 25.25°, of the divided light-guiding body in the display according to the present invention.

FIG. 7 shows an example where a is 20°, and β is 25.25°. By using the divided light-guiding body 8 having such a configuration, the optical path from the liquid crystal display device to the divided light-guiding body 8 can be designed freely to some extent.

Figure 14:
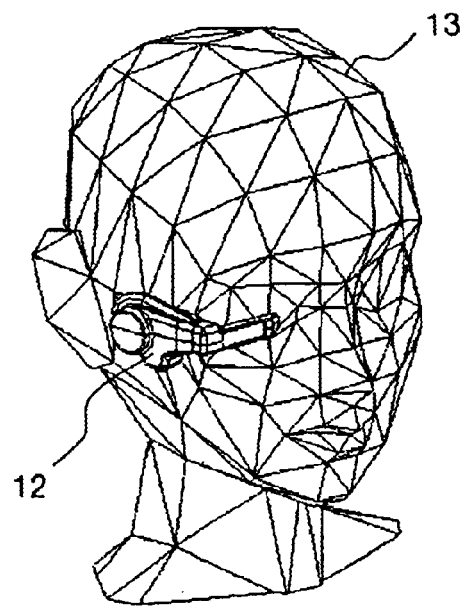
FIG. 14 is a diagram which shows an image in which a head mount section of the display according to the present invention is mounted on the head.
Figure 15:
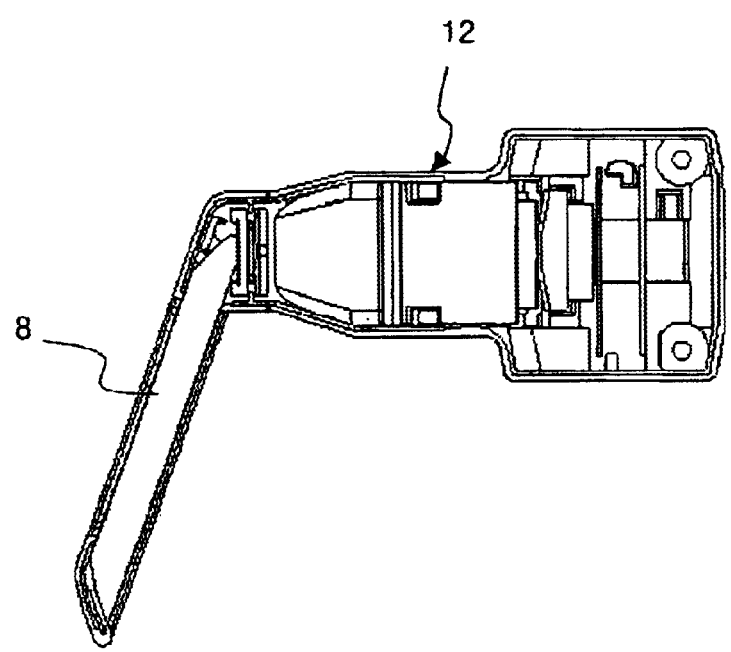
FIG. 15 is a diagram which shows a perspective image of an optical system housing portion in the head mount section of the display according to the present invention.

It becomes possible to arrange the optical system shown in FIG. 2 near the temple of a human body, by designing the total reflecting surface 842 such that the focal point thereof becomes a pinhole focal point outside the divided light-guiding body 8, and designing the optical system so as to be suitable for the shape of the human head. As shown in FIG. 7, the length of the divided light-guiding body 8 can be made approximately 53 mm. FIG. 14 shows an image in which a head mount section 12 housing the optical system having the configuration as shown in FIG. 2 is mounted on an observer's head 13. FIG. 15 shows a perspective image of the optical system housing portion in the head mount section 12.

Figure 18:
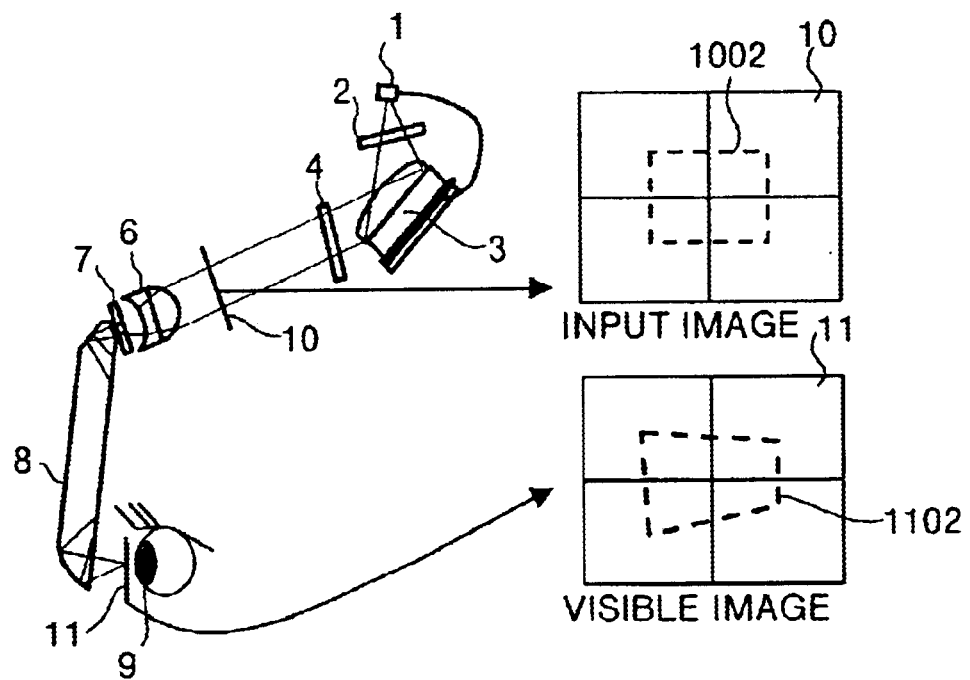
FIG. 18 is a diagram which shows of a configuration in which there is no correcting lens in the optical system shown in FIG. 2.

The correcting lens 5 will now be explained. FIG. 18 is a diagram which shows of a configuration in which there is no correcting lens in the optical system shown in FIG. 2. When there is no correcting lens, as shown in FIG. 18, the image 1002 entering the imaging device 6 is not distorted (see the virtual screen 10 in front of the imaging device 6). However, the image 1102 entering the observer's eye 9 may be distorted (see the virtual screen 11 in front of the eye 9). In this case, the observer will see a distorted image (visible image). It can be considered that this is because the virtual elliptical light-guiding body 801 is divided to form a flat total reflecting surface 842.

In order to remove the distortion of this visible image, as shown in FIG. 2, the correcting lens 5 is provided in front of the divided light-guiding body 8. By this correcting lens 5, the image entering the divided light-guiding body 8 is distorted beforehand, so that the visible image is not distorted, that is, the distortion of the image generated by the divided light-guiding body 8 is removed (compare the images on the virtual screens 10 in FIG. 2 and FIG. 18).

Design of the correcting lens 5 depends on the combination of the correcting lens 5 and the imaging device (lens) 6. FIG. 8 is a chart which shows combinations of imaging lenses and correcting lenses, studied by the present inventors. In this embodiment, of the combinations shown in the table of FIG. 8, a combination of a plano-convex lens made of BK7 having a radius of curvature r of 8.82 mm as the imaging device 6, and a double-concave lens having a radius of curvature r1 of 131.16 mm on the imaging device side and a radius of curvature r2 of 90.89 mm on the liquid crystal display device side as the correcting lens 5 is preferable.

Figure 1:
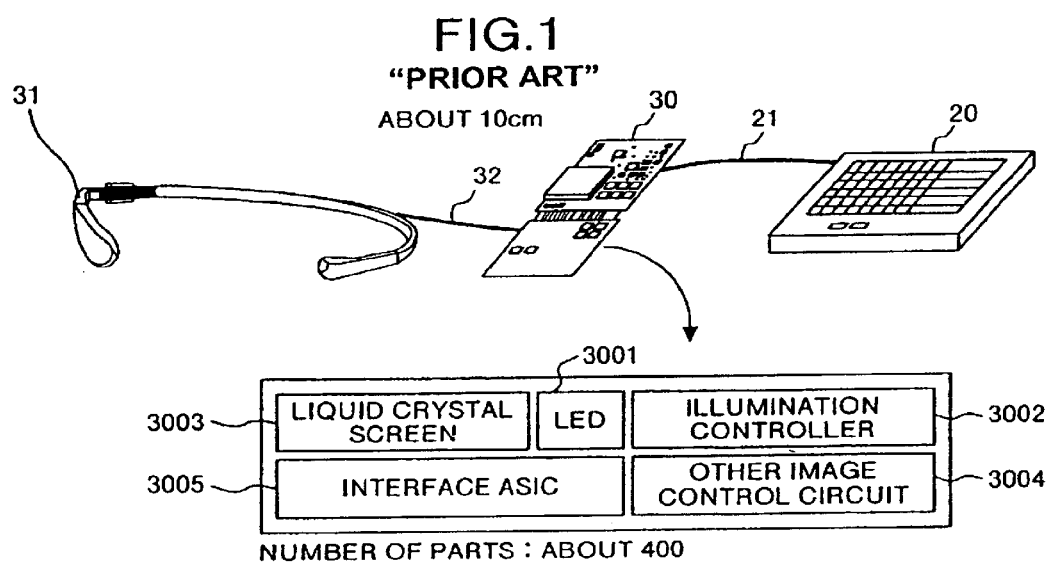
FIG. 1 is a diagram which shows the outline of the overall configuration of a conventional display.

FIG. 1 is a diagram which explains the relation between the coordinate positions of the field lens 302, the correcting lens 5 and the imaging device 6. In FIG. 1, it is assumed that the center of a flat plane S2 of the field lens 302 on the liquid crystal display device side is an origin of coordinate axes (X=0, Z=0, θ=0), the direction of normal of the flat plane S2 is X axis, and the direction perpendicular thereto is Z axis. The flat plane S2 of the field lens 302 becomes a plane of Z=0. Here, θ is an angle between the Z axis.

Figure 9:
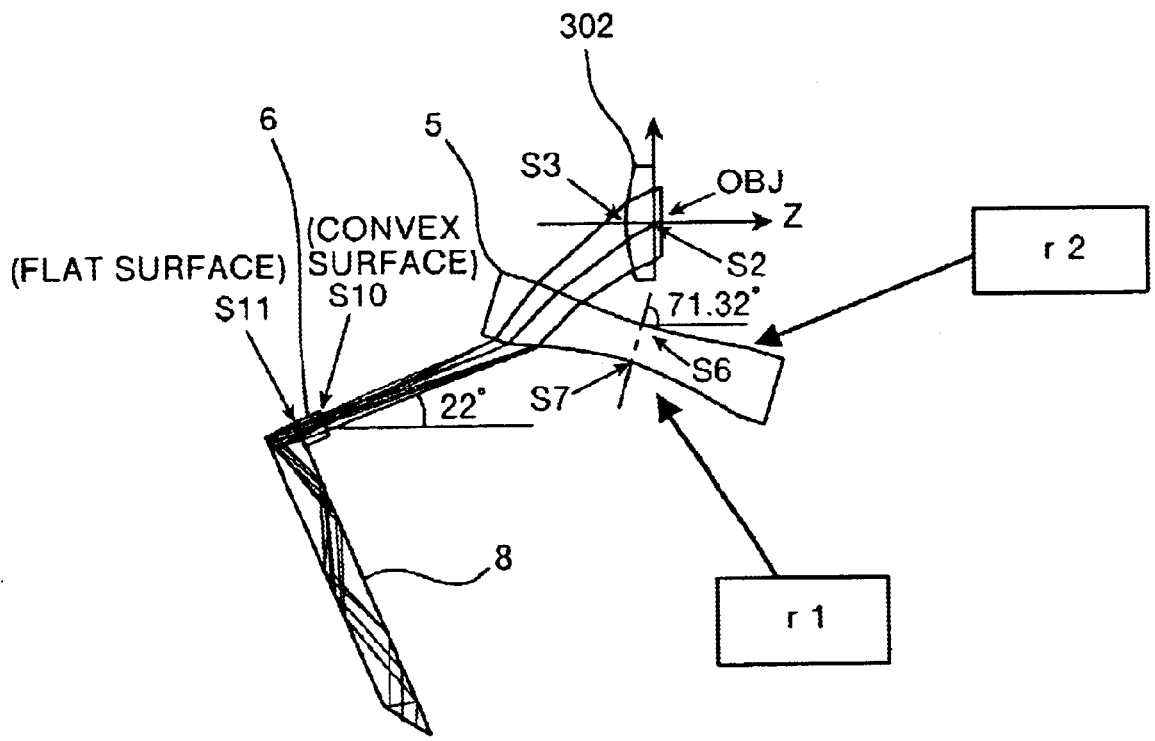
FIG. 9 is a diagram which explains the relation between the coordinate positions of optical components in the display according to the present invention.

For example, in this embodiment, as shown in FIG. 9, the coordinates of an image displayed by the liquid crystal display device is such that X=0.37461, Z=0.92718, and θ=0.0000. The central coordinates of a convex surface S3 of the field lens 302 on the correcting lens 5 side is such that X=0.00000, Z=−4.00000, and θ=0.0000. The central coordinates of a concave surface S6 of the correcting lens 5 on the field lens 302 side is such that X=−15.65993, Z=−1.98712, and θ=−71.3237.

The central coordinates of a concave surface S7 of the correcting lens 5 on the imaging device 6 side is such that X=−21.34399, Z=−3.90844, and θ=−71.3237. The central coordinates of a convex surface S10 of the imaging device 6 on the correcting lens 5 side is such that X=−29.56427, Z=−50.82928, and θ=−22.0000. The central coordinates of a plane S11 of the imaging device 6 on the divided light-guiding body 8 side is such that X=−30.50078, Z=−53.14724 and θ=−22.0000. The coordinates described here are design values.

Figure 10:
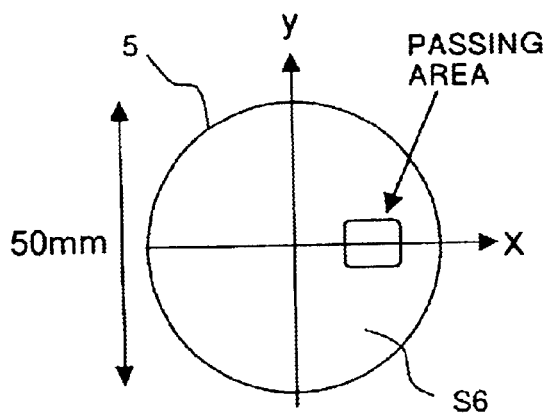
FIG. 10 is a diagram which explains a light passing area in the correcting lens in the display according to the present invention.

FIG. 10 is a diagram which explains a light passing area in the correcting lens 5. The correcting lens 5 has a configuration such that, for example, two concave lenses are adhered on the planes thereof. This adhered plane is designated as an xy plane, that is, a plane of z=0, and the central position of the concave surface S6 of the correcting lens 5 on the field lens 302 side is designated as x=0, and y=0. Hereinafter, the coordinates are expressed in the form of (x, y, z).

The coordinates of the light passing area in the concave surface S6 are, as shown in FIG. 10, (13.5574, 5.571812×10$^{-20}$, 0.710246), (13.5576, 0.154515, 0.71035), (13.5576, −0.154515, 0.71035), (13.7029, 5.614069×10$^{-20}$, 0.725615), (13.4145, 5.530021×10$^{-20}$, 0.695311), (16.6874, −2.19314, 1.09627), (16.6733. −1.98805, 1.0911), (16.7013, −2.39789, 1,10172), (16.9103, −2.19392, 1.12539), (16.4673, −2.19217, 1.0679), (16.6874, 2.19314, 1.09627), (16.7013, 2.39789, 1.10172), (16.6733, 1.98805, 1.0911), (16.9103, 2.19392, 1.12539), (16.4673, 2.19217, 1.0679), (9.69379, 2.66822, 0.390139), (9.69297, 2.78583, 0.392557), (9.69491, 2.55041, 0.387847), (9.8095, 2.66171, 0.398729), (9.58029, 2.67458, 0.381815), (9.69379, −2.66822, 0.390139), (9.69491, −2.55041, 0.387847), (9.69297, −2.78583, 0.392557), (9.8095, −2.66171, 0.398729), (9.58029, −2.67458, 0.381815).

The coordinates of the light passing area in the concave surface S7 of the correcting lens 5 on the imaging device 6 side are (17.2567, 7.585563×10$^{-20}$, −1.70406), (17.257, 0.210361, −1.70437), (17.257, −0.210361, −1.70437), (17.4779, 7.654897×10$^{-20}$, −1.74847), (17.0404, 7.517400×10$^{-20}$, −1.6619), (20.4074, −1.73127, −2.40999), (20.3788, −1.46114, −2.39818), (20.4359, −2.0012, −2.42265), (20.749, −1.72903, −2.4919), (20.0724, −1.73315, −2.33106), (20.4074, 1.73127, −204999), (20.4359, 2.0012, −2.42265), (20.3788, 1.46114, −2.39818), (20.749, 1.72903, −2.4919), (20.0724, 1.73315, −2.33106), (13.396961, 2.24204, −1.05173), (13.4016, 2.41053, −1.05708), (13.3911, 2.07342, −1.04678), (13.57, 2.23273, −1.07839), (13.2259, 2.25111, −1.02598), (13.3961, −2.24204, −1.05173), (13.3911, −2.07342, −1.04678), (13.4016, −2.41053, −1.05708), (13.57, −2.23273, −1.07839), (13.2259, −2.25111, −1.02598).

The light passing areas in the concave surfaces S6 and S7 are respectively areas understood by the above-described 25 coordinates. The correcting lens 5 is one obtained by cutting a lens having the concave surface S6 having a diameter of 50 mm, so as to include this light passing area, and has such a configuration in order to reduce the size of the optical system as small as possible. The coordinates described here are design values.

Figure 11:
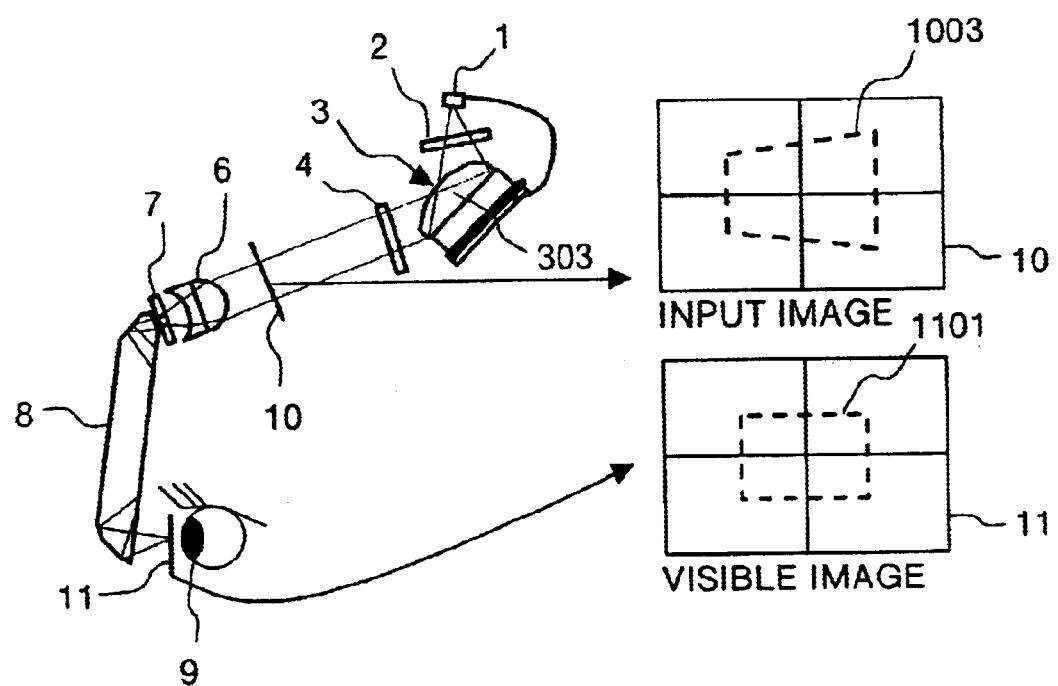
FIG. 11 is a diagram which explains another example of the optical system in the display according to the present invention.

FIG. 11 is a diagram which explains another example of the optical system in the display according to the present invention. In the optical system having the configuration as shown in FIG. 11, instead of using the correcting lens 5, there is used a field lens 303 having a function similar to that of the correcting lens 5, that is, a function of distorting an image 1003 entering the imaging device 6 beforehand. The surface of this field lens 303 is formed to be a free-form surface which distorts the image entering the imaging device 6 in the direction of removing the distortion due to the divided light-guiding body 8. The correcting lens 5 becomes unnecessary by using the free-form surface lens as the field lens 303, and hence the optical system is made smaller and lighter.

FIG. 12 is a diagram which explains still another example of the optical system of the display according to the present invention. In the optical system having the configuration shown on the lower side of FIG. 12, as the field lens 304, there is used a lens in which a curved surface for condensing light is added to a free-form surface having the function of distorting an image entering the imaging device 6 beforehand, as described above. As a result, for example, the distance from the field lens to the imaging device 6 is shortened to about ⅕, compared to the optical system having the configuration shown in FIG. 11 (the optical system shown on the upper side of FIG. 12). For example, in the optical system shown in FIG. 11, the width of an image output from the field lens 303 is about 5 mm, and the width of an image shone into the imaging device 6 is about 2 mm. Therefore, the distance between the field lens 303 and the imaging device 6 becomes about 50 mm.

On the other hand, in the optical system shown in FIG. 12, the free-form surface of the field lens 304 is a curved surface having a high light-gathering power. Therefore, by appropriately changing the curvature of the imaging device 6, the distance between the field lens 303 and the imaging device 6 can be made 10 mm, about ⅕ of the optical system shown in FIG. 11. That is, the optical system is made smaller and lighter.

FIG. 13 is a diagram which explains an example in which a reflector is added in the optical system of the display according to the present invention. The upper figure in FIG. 13 shows an optical system having the same configuration as that shown in FIG. 11. That is, the light reflected by the display device 3 is made to directly enter the imaging device 6 via the analyzer 4. On the other hand, in the optical system shown in the lower figure in FIG. 13, a reflector 14 is arranged in the optical system, so that the light reflected by the display device 3 is further reflected by the reflector 14, and is made to enter the imaging device 6 via the analyzer 4.

By bending the optical path by the reflector 14, the space required for realizing the optical path of the optical system becomes about half the size of the optical path shown in FIG. 11, and hence the size of the head mount section 12 is made smaller. The reflector 14 may be arranged between the analyzer 4 and the imaging device 6, or a reflector may be provided also between the light emission element 1 and the display device 3 to bend the optical path therebetween.

Figure 16:
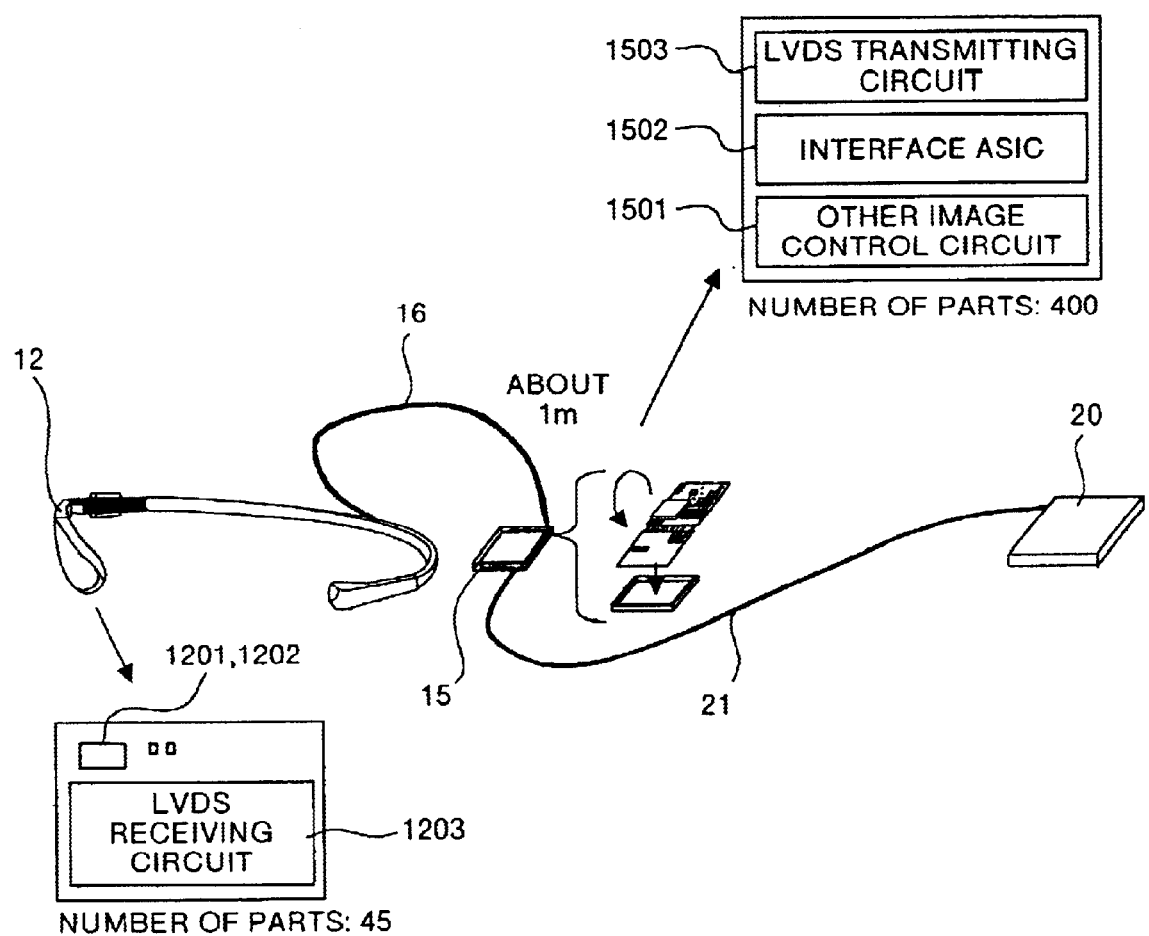
FIG. 16 is a diagram which shows the outline of the overall configuration of the display according to the present invention.

FIG. 16 is a diagram which shows the outline of the overall configuration of the display according to the present invention. As shown in FIG. 16, the display in this embodiment has a configuration such that a minimum circuit required for driving of the light emission element 1 and driving of the liquid crystal display device is housed in the head mount section 12 which is mounted on an observer's head 13, and other circuits for the interface with an external attachment 20 such as a computer and control of the image are housed in a controller 15. That is, in the head mount section 12, for example, a driving circuit 1201 of the light emission element 1 and a driving circuit 1501 of the liquid crystal display device are housed. In the controller 15, for example, an other image control circuit 1501 and an interface circuit (ASIC) 1502 are housed.

Transfer of signals such as an image signal between the circuit housed in the controller 15 and the circuit housed in the head mount section 12 is performed, for example, via a communication unit such as LVDS (Low Voltage Digital Signal). Therefore, an LVDS receiving circuit 1203 is housed in the head mount section 12, and an LVDS transmitting circuit 1503 is housed in the controller 15. The number of parts of the circuits housed in the head mount section 12, including the circuit for the transfer, is about 45, and on the other hand, the number of parts of the circuits housed in the controller 15 is about 400.

The LVDS transmitting circuit 1503 and the LVDS receiving circuit 1203 are connected by a cable 16 for LVDS. The length of this cable 16 is for example about 1 m, and hence this display can be used in such a manner that the controller 15 is put in a pocket of clothes or in a bag. The external attachment 20 is connected to the controller 15 via a cable 21.

Figure 17:
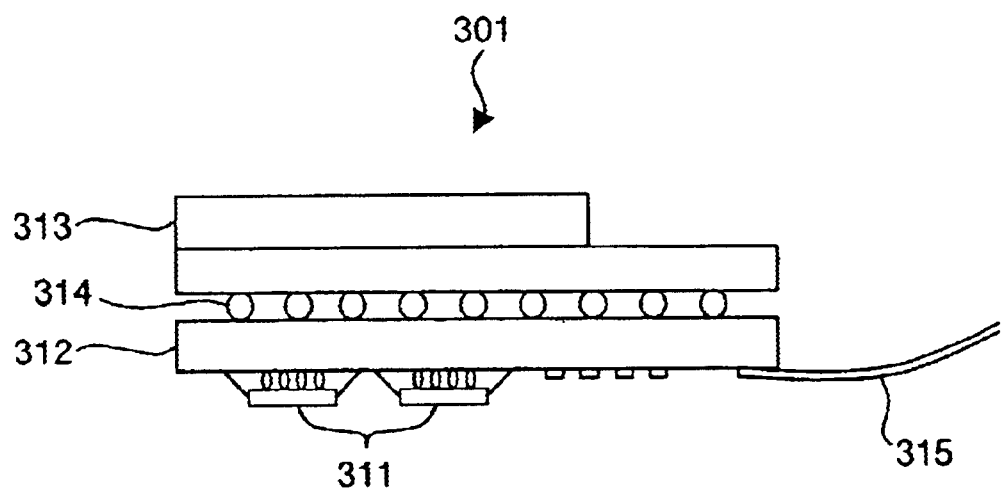
FIG. 17 is a diagram which shows an image of a circuit portion arranged in the head mount section of the display according to the present invention.

FIG. 17 is a diagram which shows an image of the circuit portion housed in the head mount section 12. In this embodiment, the circuit housed in the head mount section 12, that is, the driving circuits 1201 and 1202, and the LVDS receiving circuit 1203 are constituted by one or more bare chips. As in the liquid crystal display device unit 301 shown in FIG. 17, the bare chip 311 is mounted on a circuit board of a size similar to a liquid crystal chip 313 of for example 18×14 mm square. This circuit board 312 is attached to the rear face of the liquid crystal chip 313 by a solder bump 314.

As described above, by dividing the circuits, and forming the circuits housed in the head mount section 12 in a bare chip to arrange it on the rear face of the liquid crystal chip, the circuits in the head mount section 12 can be made minimum in size and weight, thereby enabling realization of a small and lightweight head mount section 12. In FIG. 17, reference numeral 315 denotes a cable for supplying an electric signal to the light emission element 1.

As a comparison, the overall configuration of a conventional display will now be explained. FIG. 1 is a diagram which shows the outline of the overall configuration of the conventional display. As shown in FIG. 1, conventionally, all circuits (number of parts: 400) including an LED 3001, an illumination controller 3002, a liquid crystal screen 3003, an other image control circuit 3004, and an interface ASIC 3005 are provided on the same circuit board 30. Therefore, this circuit board 30 has a size of 10×20 cm.

Conventionally, the LVDS is not used for transmission of image signals, and hence the display is easily affected by noise, and as a measure therefor, it is necessary to arrange this large circuit board 30 near the head mount section 31. Therefore, the length of a cable 32 connecting the head mount section 31 and the circuit board 30 is about 10 cm. Therefore, the head mount section 31 as well as the controller which houses the circuit board 30 are mounted on an observer's head. As a result, the conventional display has a problem in that the device mounted on the head becomes large and heavy.

According to the embodiments described above, the optical system becomes small and lightweight by using the divided light-guiding body 8. Further, the driving circuits 1201 and 1202 and the LVDS receiving circuit 1203 are formed in a bare chip, mounted on the rear face of the liquid crystal chip, and housed in the head mount section 12. On the other hand, the other image control circuit 1501 and the LVDS transmitting circuit 1503 are housed in the controller 15, and the head mount section 12 and the controller 15 are connected via the LVDS. As a result, a head mount section 12 as small and light as being mountable on an observer's head is realized. The head mount section 12 is mounted on the head 13 without interfering with the observer's temporal region.

In the present invention, the design can be variously changed, other than the above-described embodiments. For example, the size, the angle and coordinate values in the explanation of the optical system are only examples, and appropriately changed based on the specification required for the display.

According to the present invention, since an optical system becomes small and lightweight, it is possible to obtain a display having a head mount section small and lightweight so as to mount it on the head, without interfering with the observer's temporal region.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A display comprising as the light-guiding body, there is used a divided light-guiding body, having such a construction that a virtual elliptic light-guiding body, formed of a first ellipse having a first focal point and a second focal point and a second ellipse having a third focal point and a fourth focal point, is divided at a focal point corresponding to the second focal point, and at an end of the light-guiding body formed by the segmentation, there are formed a plane of incidence perpendicular to the optical axis of the light entering the end and a total reflecting surface which totally reflects the light entering from the plane of incidence, so that the end becomes thin, wherein the virtual elliptic light-guiding body having an arrangement such that, the second focal point and the third focal point overlap each other, and having a construction such that a first concave reflecting surface and a second concave reflecting surface are arranged on the same side with respect to a virtual line connecting the first to the fourth focal points, and a pair of flat reflecting surfaces facing each other is formed between the first concave reflecting surface and the second concave reflecting surface, so that the light reflected by the first concave reflecting surface passes through a focal point corresponding to the second focal point, located between the pair of reflecting surfaces, towards the second concave reflecting surface, while being reflected by the pair of flat reflecting surfaces.

2. The display according to claim 1, wherein the display device is constituted of a liquid crystal display device, and a polarizer and an analyzer are respectively provided in front of and back sides of the liquid crystal display device in the optical path.

3. The display according to claim 2, wherein the liquid crystal display device is integrated with a field lens.

4. The display according to claim 1, wherein a correcting lens is provided on the optical path between the display device and the divided light-guiding body, which distorts an image entering the divided light-guiding body beforehand so as to compensate for the distortion of a visible image, in order to correct the distortion of the visible image watched by an observer which is emitted from the divided light-guiding body.

5. The display according to claim 4, wherein both surfaces of the correcting lens are formed by a concave surface which constitutes a part of a spherical surface having a different curvature.

6. The display according to claim 3, wherein the field lens is a free-form surface lens which also works as a correcting lens which distorts an image entering the divided light-guiding body beforehand so as to compensate for the distortion of a visible image, in order to correct the distortion of the visible image watched by an observer which is emitted from the divided light-guiding body.

7. The display according to claim 6, wherein the field lens is a free-form surface lens having a high light-gathering power.

8. The display according to claim 1, wherein in the divided light-guiding body, if it is assumed that the angle between the plane of incidence and the virtual plane obtained by extending a reflecting surface, of the pair of flat reflecting surfaces facing each other, on the side crossing the plane of incidence is a, and the angle between the total reflecting surface and the virtual plane obtained by extending a reflecting surface, of the pair of flat reflecting surfaces facing each other, on the side crossing the total reflecting surface is β, α and β respectively satisfy 0°<α<θ and 0°<β<(θ−α)/2, and 42°<θ<90°.

9. The display according to claim 1 further comprising a head mount section mounted on an observer's head and a controller connected to the head mount section via a wired communication unit, the head mount section includes the optical system, a display device driving circuit and a receiving circuit, and the controller includes an interface circuit for the connection with an external attachment, an image control circuit and a transmitting circuit.

10. The display according to claim 9, wherein the display device driving circuit and the receiving circuit are provided on a circuit board fitted to the rear face of the display device and having substantially the same size as that of the rear face of the display device.

11. The display according to claim 9, wherein the communication unit is a communication unit by LVDS.

12. The display according to claim 1, wherein in the divided light-guiding body, the angle between the plane of incidence and the virtual plane obtained by extending a reflecting surface, of the pair of flat reflecting surfaces facing each other, on the side crossing the plane of incidence is 20°, and the angle between the total reflecting surface and the virtual plane obtained by extending the reflecting surface, of the pair of flat reflecting surfaces facing each other, on the side crossing the total reflecting surface is 25.25°.

13. The display according to claim 1, wherein at least one reflector is provided on the optical path between the light emission element and the imaging device.

* * * * *

UNITED STATES PATENT AND TRADEMARK OFFICE
CERTIFICATE OF CORRECTION

PATENT NO.    : 6,903,876 B2
DATED         : June 7, 2005
INVENTOR(S)   : Toru Okada It is certified that error appears in the above-identified patent and that said Letters Patent is hereby corrected as shown below:

<u>Column 12,</u>
Line 22, delete "a" and insert -- $\alpha$ --.

Signed and Sealed this

Twenty-seventh Day of September, 2005

JON W. DUDAS
*Director of the United States Patent and Trademark Office*